United States Patent [19]

Zoerb

[11] 3,707,979
[45] Jan. 2, 1973

[54] COOLED TEMPERATURE SENSITIVE OSCILLATOR

[75] Inventor: Edward G. Zoerb, Roseville, Minn.

[73] Assignee: Honeywell Inc., Minneapolis, Minn.

[22] Filed: Feb. 28, 1969

[21] Appl. No.: 803,482

[52] U.S. Cl. ..................................137/81.5, 73/339
[51] Int. Cl. ..................................................F15c 1/08
[58] Field of Search ................137/81.5; 73/357, 361

[56] References Cited

UNITED STATES PATENTS 3,158,166   11/1964   Warren ..............................137/81.5
3,301,715   1/1967   Gerrard et al. ..........................73/361
3,451,269   6/1969   Johnson ..............................73/357

OTHER PUBLICATIONS

A New Method for Determining the Static Temperature of High-Velocity Gas Streams, by J. A. Clark and W. M. Rohsenow, Transaction of the ASME, Vol. 74, Feb. 1952, pages 221-225, 73-357.

Primary Examiner—Samuel Feinberg
Attorney—Charles J. Ungemach, Ronald T. Reiling and Charles L. Rubow

[57] ABSTRACT

A temperature sensor of the fluidic oscillator type wherein the oscillator housing is cooled to permit the measurement of temperature exceeding the melting temperature of the housing.

7 Claims, 3 Drawing Figures

INVENTOR.
EDWARD G. ZOERB

BY Ronald T. Reiling
ATTORNEY

COOLED TEMPERATURE SENSITIVE OSCILLATOR

BACKGROUND OF THE INVENTION

This invention relates generally to fluid handling apparatus and more specifically to pure fluid temperature responsive oscillators.

It has become desirable, and frequently necessary, in an increasing number of applications to measure the temperature of very hot fluids. Such applications include measuring the temperatures of combustion gases in internal combustion engines, measuring the temperatures of gases at hypersonic flow velocities and measuring plasma temperatures. In many of these cases, it is necessary to measure temperatures exceeding the melting temperature of materials suitable for constructing temperature sensors. In many other cases, although the temperature being measured does not exceed the melting temperature of the sensor body, the temperatures are so high that materials suitable for constructing temperature sensors oxidize and erode very rapidly. In addition to the high temperature requirements of these applications, it is frequently further necessary that the temperature sensor have very fast response and/or that it be sufficiently rugged to operate reliably in otherwise very severe environments.

As examples of materials problems encountered in attempting to construct such sensors, it has been found that ceramic materials may be used only in applications invovling slow temperature changes where thermal shock is not a problem. Conversely, although refractory metals are capable of withstanding thermal shock, they can be used only in non-oxidizing atmospheres.

Various other devices have been developed as a result of requirements for measuring very high temperatures.

These devices include optical pyrometers, cooled thermocouples and very massive thermocouples. Although these and certain other prior art temperature measuring instruments are capable of measuring very high temperatures, each of them suffers from certain disadvantages that limit its usefulness.

For example, optical pyrometers may be used to measure high temperatures with very good accuracy. However, an optical pyrometer is bulky and complex, it must be located remotely from the source of the temperature being measured, and it has extremely poor time response.

Cooled thermocouples are not, in themselves, bulky or complex and can be located directly in a hot fluid whose temperature is being measured, but they are difficult to calibrate accurately. This difficulty stems from the fact that the signal produced by the thermocouple is directly dependent upon the thermocouple junction temperature. In a cooled thermocouple the junction temperature is determined both by the temperature being measured and the temperature of the cooling medium. Establishment of an accurate calibration depends upon constant radiation, conduction and convection rates. As a thermocouple approaches a high temperature, it discolors, thus changing its radiation rate, and hence its calibration. Further, if the velocity of the fluid whose temperature is being measured changes, the conduction and convection rates change because of changes in the stagnation velocity and stagnation temperature. Hence, additional errors are introduced into the measurement, necessitating the use of complex correction techniques.

Massive thermocouples relay on ablation of the thermocouple material to prevent excessively rapid destruction during the measurement of extreme temperatures. Such a thermocouple is simple, rugged and inexpensive, but has an extremely slow time response because of the thermal inertia due to its mass. In addition, such a thermocouple must be replaced frequently because of the continual oxidation and erosion of the material from which it is constructed.

Because of the disadvantages of prior art high temperature measuring instruments, a present need exists for an accurate, simple and rugged high temperature measuring instrument having fast time response. Experience with prior art high temperature sensors (particularly, the cooled thermocouple) has led to the conclusion that a cooled temperature sensor is unsuitable for making temperature measurements where accuracy and fast time response are required. The applicant has, however, discovered certain characteristics of specially constructed temperature sensitive fluidic oscillators which permit them to be cooled without introducing prohibitive errors into the temperature measurement. Further, the applicant has provided such a temperature sensitive fluidic oscillator which incorporates special cooling features so as to provide an accurate, rapidly responding temperature sensor capable of measuring very high temperatures.

SUMMARY OF THE INVENTION

Briefly, the applicant has discovered that the response of certain specially constructed temperature sensitive fluidic oscillators is only weakly affected by the temperature of the oscillator body. The applicant's invention comprises such a fluidic oscillator formed in a housing and means for maintaining the housing at a temperature below its melting temperature. For applications requiring high accuracy, means may be provided for monitoring the temperature of the oscillator housing and correcting the output signal as a function of the housing temperature.

DESCRIPTION OF THE PREFERRED EMBODIMENTS

Figure 1:
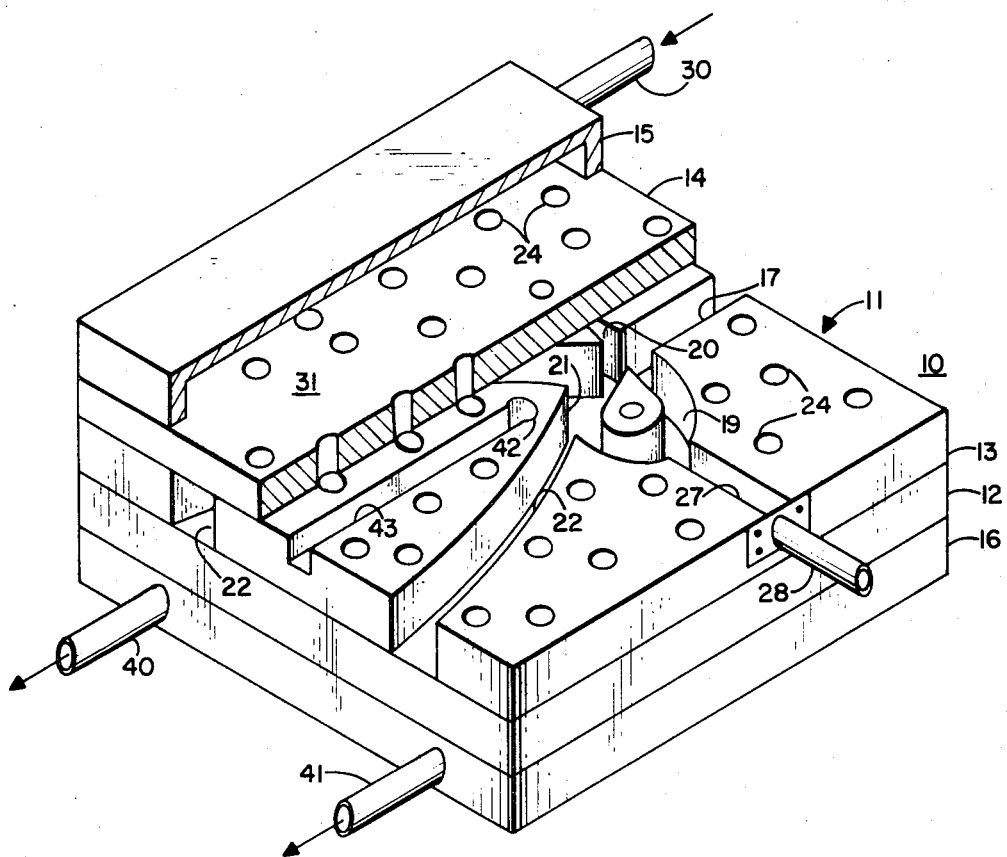
FIG. 1 illustrates a first embodiment of the applicant's invention incorporating a fluidic feedback oscillator.

Referring to FIG. 1, reference numeral 10 generally identifies a first embodiment of the applicant's unique cooled temperature sensor. This temperature sensor embodiment employs a fluidic feedback oscillator of the type shown in U. S. Pat. No. 3,158,166 issued to R. W. Warren. For the purpose of this specification, a feedback oscillator is defined to be a fluidic oscillator which includes at least one distinct passage for providing feedback signals to switch the oscillator output signal in an alternating manner.

Oscillator 10 is formed in a housing identified by reference numeral 11 which is shown as comprising three plate elements 12, 13 and 14. Plate element 13 has various openings formed therein and is sandwiched between elements 12 and 14. The passages formed through cooperation of elements 12, 13 and 14 form the oscillator. These passages include an inlet passage 17, a first feedback passage 19, a second feedback passage 20 and a pair of exhaust passages 22. A splitter element 21 is aligned with inlet passage 17 and separates the entrances to exhaust passages 22.

A signal pickoff passage 27 is shown in communication with feedback passage 19. An output signal conduit 28 is shown in communication with pickoff passage 27 to facilitate the connection of any desired utilization device. It is pointed out that, in operation, oscillating signals of the same frequency are produced in feedback passages 19 and 20 and exhaust passages 22. Accordingly, although pickoff passage 27 is shown in communication with feedback passage 19, it can equally as well communicate with feedback passage 20 or either of exhaust passages 22. Further, although a specific oscillator configuration is shown, the applicant does not wish to be limited to this configuration, but contemplates the use of other feedback oscillator configurations having suitable characteristics.

The body of housing 11 is provided with a plurality of cooling passages 24 which extend through plate elements 12, 13 and 14. One end of each of passages 24 terminates in a manifold 31 formed by element 14 and a cover element 15 (shown in section). The other end of each of passages 24 terminates in a manifold formed by element 12 and a cover element 16. Manifold 31 communicates with a source (not shown) of cooling fluid through an inlet 30. The manifold in cover element 16 communicates with a sink (not shown) for the cooling fluid through outlets 40 and 41.

Plate element 13 includes provisions at 42 for imbedding a thermocouple therein. The leads from a thermocouple at 42 are brought outside housing 11 through a channel 43. The reasons for imbedding a thermocouple in housing 11 will be discussed hereinafter.

Figure 2:
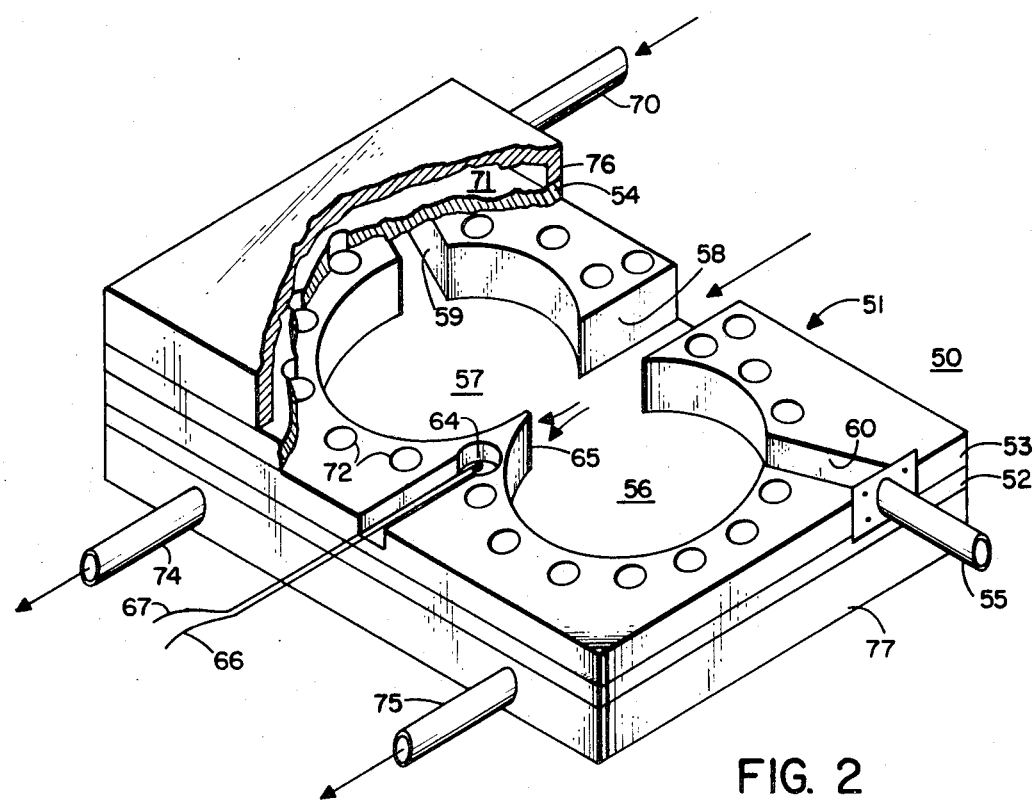
FIG. 2 illustrates a second embodiment of the applicant's invention incorporating a fluidic sonic oscillator.

Referring to FIG. 2, reference numeral 50 generally identifies a second embodiment of the applicant's unique cooled temperature sensor. Temperature sensor 50 employs a fluidic sonic oscillator which is formed in a housing 51 comprising plate element 52, 53 and 54. A sonic oscillator suitable for this useage is disclosed in the applicant's co-pending application Ser. No. 469,972, filed June 30, 1965 (now U.S. Pat. No. 3,613,452 issued Oct. 19, 1971) and assigned to the assignee of the present invention. For the purpose of this specification, a sonic oscillation is a fluidic oscillator which includes no distinct feedback passage, and in which the frequency of oscillation is a function of certain characteristic oscillator dimensions.

Plate element 53 has various openings therein, and in combination with elements 52 and 54 forms a plurality of fluid passages and chambers. The passages and chambers include an inlet passage 58, a pair of chambers 56 and 57 and a pair of exhaust passages 59 and 60. Inlet passage 58 is aligned with a splitter element 65. Chambers 56 and 57 are symmetrically located on opposite sides of passage 58 and splitter element 65. An output signal conduit 55 is shown in communication with exhaust passage 60. However, oscillating signals of the same frequency are produced in both exhaust passages 59 and 60. The output signal conduit can equally as well be connected to exhaust passage 59. Further, although a specific sonic oscillator configuration is shown in FIG. 2, the applicant does not wish to be limited to this configuration, but contemplates the use of other sonic oscillator configurations having suitable characteristics.

The body of housing 51 is provided with a plurality of cooling passages 72 which extend through plate elements 52, 53 and 54. One end of each of passages 72 terminates in a manifold 71 formed by element 54 and a cover element 76 (shown partially broken away). The other end of each of passages 72 terminates in a manifold formed by element 52 and a cover element 77. Manifold 71 communicates with a source (not shown) of cooling fluid through an inlet 70. The manifold in cover element 77 communicates with a sink (not shown) for the cooling fluid through outlets 74 and 75.

A thermocouple 64 is shown imbedded in housing 51. Reference numerals 66 and 67 identify leads from thermocouple 64 which are brought outside housing 11. The function of thermocouple 64 will be discussed hereinafter.

The temperature sensors shown in both FIGS. 1 and 2 are specially constructed to prevent bending and warpage of the sensor housings due to large thermal gradients therein. Conventional construction techniques, such as bolting and riviting have proved unsatisfactory under extreme temperature conditions. Special construction features which minimize bending or warpage are required because such distortion introduces errors into the output signal. Examples of construction features which may be employed are forming the sensor housing from one piece of material as in a powder forming process, or diffusion bonding the separate portions of the housing into a single structure.

In operation of the temperature sensor of FIG. 1, hot fluid whose temperature is to be sensed is introduced through inlet passage 17 and forms a stream which impinges on splitter element 21. Due to random fluctuations which are inherent in such a fluid stream and the internal geometry of the oscillator, unequal fluid entrainment occurs on opposite sides of the stream. This results in deflection of the stream toward the exhaust passage adjacent the area of maximum fluid entrainment. As fluid flows into the exhaust passage, a portion thereof is directed into the negative feedback passage associated with that exhaust passage. This results in a pressure front which travels through the feedback passage and impinges transversely on the incoming fluid stream. The incoming fluid stream is thereby transferred to the other exhaust passage and a similar operational sequence occurs. The frequency at which the incoming fluid stream oscillates between the outlet passages is controlled by the length of the feedback paths and the acoustic velocity in the fluid therein. The acoustic velocity in the fluid is a function of its temperature. Accordingly, the frequency of the oscillation set up in the incoming stream is a function of its temperature.

Since the temperature of the incoming fluid may be above the maximum temperature housing 11 is capable of withstanding, means is provided for cooling the housing. This cooling means comprises manifold 31, the manifold in element 16, cooling passages 24 and means for circulating a cooling fluid through the manifolds and cooling passages. It should be noted that the cooling fluid does not mix with the fluid whose temperature is being measured, but only serves to cool the housing.

The primary function of the cooling means is to keep housing 11 at a temperature below its maximum permissible temperature. In many applications this may be adequately accomplished by merely circulating a relatively constant flow of cooling fluid at a relatively constant temperature through passages 24 in housing 11. In such an application no automatic control over coolant flow is required.

In other applications, it may be desirable to maintain housing 11 at a constant temperature (for example, just below the maximum permissible temperature). Alternately, it may be desirable to maintain a constant coolant flow unless the housing temperature becomes excessive, in which case the coolant flow should be increased. In still further applications it may be desirable to maintain the housing at a temperature which is a fixed amount below the temperature being sensed. In such applications, a thermocouple may be provided at 42 to sense the temperature of housing 11. Since the temperature of the housing cannot change rapidly due to its thermal inertia, a thermocouple can adequately respond to such temperature changes. The thermocouple output signal may be supplied to any one of a number of suitable conventional flow control systems so as to appropriately control coolant flow through the housing.

In operation of the oscillator of FIG. 2, hot fluid whose temperature is to be sensed is introduced through inlet passage 58 and forms a stream which impinges on splitter element 65. Through a phenomena known as the edge-tone effect, which occurs under certain conditions when a fluid stream impinges on a sharp edge splitter, the incoming fluid stream is unstable and tends to oscillate about splitter element 65. Shifting of the stream to one side of splitter element 65 results in a small fluid pressure pulse which travels in a direction transverse to the incoming stream. This fluid pulse travels across chamber 56 (or 57) and is reflected back from the opposite chamber wall. The reflected signal produces curvature in the fluid stream issuing from passage 58 in such a manner as to cause the jet to move to the opposite side of splitter element 65 and thereby produce a pressure disturbance in the opposite chamber 57 (or 56) which responds in a like manner, thus causing a complete oscillation of the fluid stream issuing from passage 58.

The frequency of oscillation of the stream about splitter element 65 is determined by the resonant frequency in chambers 56 and 57. The resonant frequency in these chambers is a function of the chamber dimensions and the acoustic velocity in the fluid therein. Since the acoustic velocity in the fluid is a function of its temperature, the resonant frequency in chambers 56 and 57, and consequently the frequency of operation of the oscillator, is determined by the temperature of the fluid in the chambers.

Cooling means comprising manifold 71, the manifold in element 77, cooling passages 72 and means for circulating a cooling fluid through the manifolds and cooling passages is provided to maintain housing 51 at a temperature below the maximum temperature it is capable of withstanding. The operation of this cooling means is identical with the operation of the cooling means associated with sensor 10 as hereinbefore described. Reference may be made to that description for further operational explanation of the cooling means for sensor 50.

The operations of the oscillators of FIGS. 1 and 2 are only briefly discussed above. More detailed discussions of their operations are contained in above-referenced U.S. Pat. No. 3,158,166 and patent application Ser. No. 469,972 respectively. It should be noted that as the temperature of the incoming fluid in each of these oscillators increases, the frequency of the output signal produced thereby also increases. Further, it is apparent that if there is a temperature difference between the fluid whose temperature is being sensed and the sensor housing, there will be heat transfer between the sensor housing and the fluid therein. Consequently, the frequency of oscillation in the sensor will depend on the temperature of the sensor housing. The applicant has, however, discovered that, for suitable oscillators under the proper operating conditions, this effect is unexpectedly small.

The capability of the applicant's temperature sensor to accurately sense temperature while in a cooled condition stems primarily from the basic phenomena on which it operates. This phenomena is that the acoustic velocity in a fluid is directly dependent on the temperature of the fluid. Thus, the primary demand made on the housing of a fluidic temperature sensor employing this phenomena is structural integrity. It is apparent that if the housing material must be cooled below the temperature being sensed to maintain its structural integrity, there will be a temperature transition region in the fluid at any point it is in contact with the sensor housing. If this transition region or boundary layer is substantial, it will have a substantial effect on the average acoustic velocity in the fluid within the sensor. The boundary layer thickness is a function of various parameters including the temperature difference between the sensor housing and the incoming fluid, and the velocity and other flow characteristics of fluid within the sensor. For normal flow velocities through the sensors of FIGS. 1 and 2, the thickness of the boundary layer is quite small (typically .05 inches). If the pressure differential across the sensor and the sensor geometry are such as to maintain turbulent flow therein, the boundary layer thickness may be even smaller. Further, under turbulent flow conditions, a relatively uniform boundary layer thickness is maintained throughout the sensor. Since this boundary layer thickness is small in comparison to a characteristic fluid path length (in the order of 1 to 2 inches) within the sensor, the fact that the boundary layer has a different temperature than the incoming fluid has a relatively insignificant effect on the frequency of the sensor output signal. Thus, the accuracy of the sensor under cooled conditions is not seriously impaired.

It should further be pointed out that the applicant's temperature sensor possesses fast time response. This characteristic is also due primarily to the fact that the output signal frequency is dependent upon the temperature of the fluid within the sensor. Under normal operating conditions, the purging time of the sensor (that is, the time required for complete replacement of the fluid in the sensor) is in the order of a few milliseconds. Since all that is required to change the output signal frequency is that the temperature of the fluid within the sensor be changed, fast time response can be achieved with the applicant's cooled temperature sensor.

In addition to the desirable characteristics of good accuracy and fast time response, the applicant's sensor is of basically simple construction. Further, its ruggedness and reliability are only limited by the characteristics of the material from which it is constructed.

Figure 3:
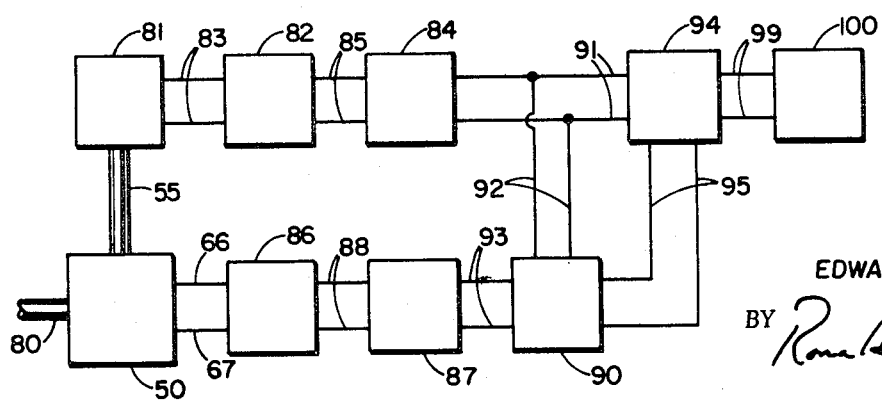
FIG. 3 illustrates a simplified circuit for correcting for errors introduced because of a temperature difference between the oscillator housing and the fluid flowing therethrough.

Although the existence of a temperature differential between the sensor housing and the fluid whose temperature is being measured does not introduce a substantial error in the sensor output signal, it is apparent that some error will be introduced. For applications requiring a highly accurate sensor, compensation for this error can be provided with relative simplicity. A block diagram of one system suitable for compensating for this error is shown in FIG. 3. As in FIG. 2, reference numeral 50 identifies a fluidic oscillator of the sonic type. Oscillator 50 is shown for purposes of illustration only. Feedback oscillator 10 of FIG. 1 may readily be substituted for oscillator 50.

In FIG. 3, fluid whose temperature is to be measured is supplied to the inlet passage in oscillator 50 by means of a conduit 80. Within the oscillator, this fluid is set into oscillation in the manner hereinbefore described. The oscillating output signal produced by oscillator 50 is transmitted by means of conduit 55 to a pneumatic-electric pressure transducer 81. Transducer 81 may be of any suitable type. One such suitable device is a capacitance transducer wherein a diaphragm forms one plate of a capacitor. The pressure pulse train output signal from oscillator 50 causes the diaphragm to deflect in accordance with the pressure pulses, thus varying the capacitance presented by the transducer.

The plates of the capacitor within transducer 81 may be connected to a frequency to level converter 82 by means of a pair of conductors 83. Converters suitable for this application are well known. One such suitable converter is General Radio model 1145A. The output signal of converter 82 is an analog electrical signal whose magnitude bears a linear relationship to the frequency of the output signal from oscillator 50. It should, however, be noted that the output signal from converter 82 is not a linear function of the temperature of the fluid entering oscillator 50. The reason for this is that the acoustic velocity in a fluid varies as the square root of its temperature. Accordingly, the frequency of the output signal produced by oscillator 50 and the magnitude of the output signal produced by converter 82 vary as the square root of the temperature of the fluid in oscillator 50.

It is frequently advantageous to have a signal which is a linear function of the fluid temperature being measured. To accomplish this result, the output signal from converter 82 is transmitted to a linearizer 84 by means of a pair of conductors 85. Linearizer 84 functions to transform the output signal produced by converter 82 into an analog electrical signal whose magnitude varies linearly with the fluid temperature being measured. A number of suitable linearizing circuits are available. In its simplest form, linearizer 84 comprises a network of resistors sized to achieve the desired linearizing function.

If the housing temperature of oscillator 50 and the temperature of the entering fluid are equal, the magnitude of the output signal produced by linearizer 84 accurately indicates the entering fluid temperature. However, in the event that the two temperatures are not equal, it may be desirable to measure the housing temperature and provide a correction for the temperature differential. Thermocouple 64 is provided to sense the housing temperature. A voltage indicative of the housing temperature is transmitted to a thermocouple amplifier 86 by means of leads 66 and 67. The voltage produced between leads 66 and 67, however, is not a linear function of the housing temperature. Consequently, the output signal from amplifier 86 is transmitted to a second linearizer 87 by means of a pair of conductors 88.

The output signal of linearizer 87 is transmitted to a first input of a non-linear function generator 90 by means of a pair of conductors 93. Such function generators are well known. One simple configuration may basically comprise a loaded vacuum tube. Function generator 90 also includes a second input at which it receives the output signal from linearizer 84 through pairs of conductors 91 and 92. Function generator 94 takes the difference between signals indicative of the housing temperature of oscillator 50 and the temperature of the fluid therein and computes a correction factor. A signal indicative of this correction factor is transmitted to a first input of a summing circuit 94 by means of a pair of conductors 95. Summing circuit 94 includes a second input at which it receives the output signal from circuit 84 through conductors 91. Circuit 94 serves to sum the signal indicative of the correction factor with the signal indicative of the temperature of the fluid within oscillator 50 and produce a signal which bears an accurate linear relationship to the temperature of the fluid entering oscillator 50.

Specifically, if the temperature being measured and the housing temperature of oscillator 50 are equal, the magnitudes of the output signals from linearizers 84 and 87 will be equal and no signal will be supplied from function generator 90 to summing circuit 94. Thus, the magnitude of the output signal from circuit 94 will be equal to the magnitude of the signal produced by linearizer 84. No correction of the signal produced by linearizer 84 is necessary and none is provided. However, if the housing temperature of oscillator 50 is higher or lower than the temperature being sensed, the signal produced by function generator 90 will be negative or positive signal whose magnitude is indicative of the difference between the two temperatures. Function generator 90 will accordingly supply an appropriate correction signal to circuit 94. This signal is used within circuit 94 to modify the signal supplied thereto from circuit 84 so as to provide an appropriate correction and produce an output signal whose magnitude bears an accurate linear relationship to the actual temperature of the fluid entering oscillator 50.

Reference numeral 100 identifies a utilization device requiring an analog electrical signal whose magnitude is accurately indicative of a measured temperature. The output signal from summing circuit 94 is transmitted to device 100 through a pair of conductors 99. Device 100 may comprise any one of a number of well known indicators or control systems.

What is claimed is:

1. Fluidic oscillator sensing apparatus capable of withstanding very high temperatures comprising:
   housing means enclosing passages which form a fluidic oscillator through which a fluid having a variable parameter may flow, the fluidic oscillator being operable to produce an output signal whose basic frequency is determined by the length of a characteristic acoustic signal path therein and whose frequency varies in accordance with variations in the variable parameter, said housing means having an upper structural temperature limit;
   cooling means for maintaining said housing means at a temperature below said temperature limit even though the temperature of fluid flowing through said fluidic oscillator is substantially higher than said temperature limit;
   sensor means for producing a compensation signal indicative of the temperature of said housing means; and
   correction means connected to receive said output signal and said compensation signal, said correction means for producing a signal indicative of said output signal modified by a factor dependent on said compensation signal so as to substantially reduce any error due to the existence of a temperature difference between said housing means and the fluid flowing through said fluidic oscillator.

2. The apparatus of claim 1 wherein said fluidic oscillator is a sonic oscillator.

3. The apparatus of claim 2 wherein said cooling means comprises passages in said housing means separated from said fluidic oscillator and means for circulating a cooling fluid through said passages.

4. The apparatus of claim 3 wherein:
   said sensor means comprises a thermocouple for producing a first electrical signal; and
   said correction means includes transducer means for converting said output signal into a second electrical signal and means for modifying said second electrical signal in response to said first electrical signal, the modified electrical signal being a signal accurately representative of the variable parameter.

5. The apparatus of claim 1 wherein said fluidic oscillator is a feedback oscillator.

6. The apparatus of claim 5 wherein said cooling means comprises passages in said housing means separate from said fluidic oscillator and means for circulating a cooling fluid through said passages.

7. The apparatus of claim 6 wherein:
   said sensor means comprises a thermocouple for producing a first electrical signal; and
   said correction means includes transducer means for converting said output signal into a second electrical signal and means for modifying said second electrical signal in response to said first electrical signal, the modified electrical signal being accurately representative of the variable parameter.

* * * * *